Patented Nov. 6, 1928.

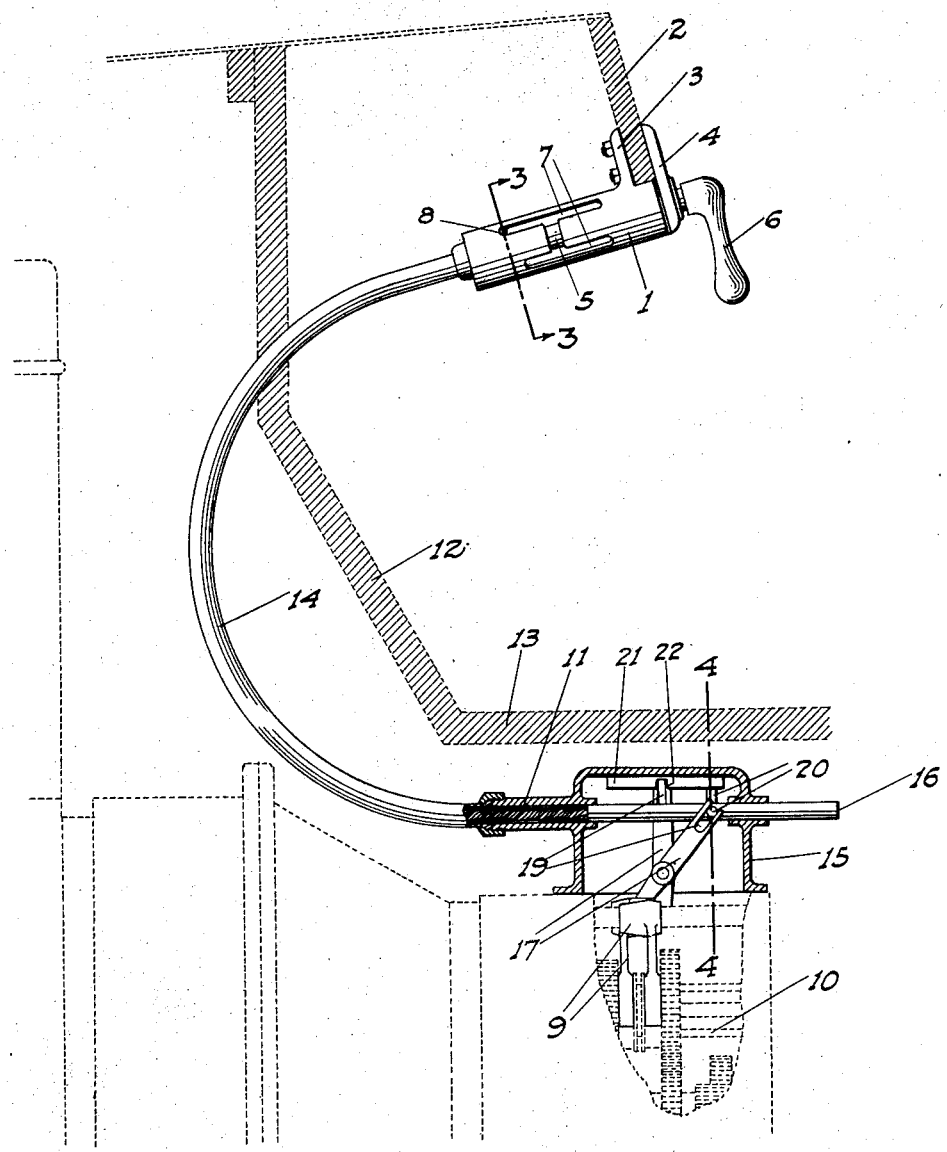

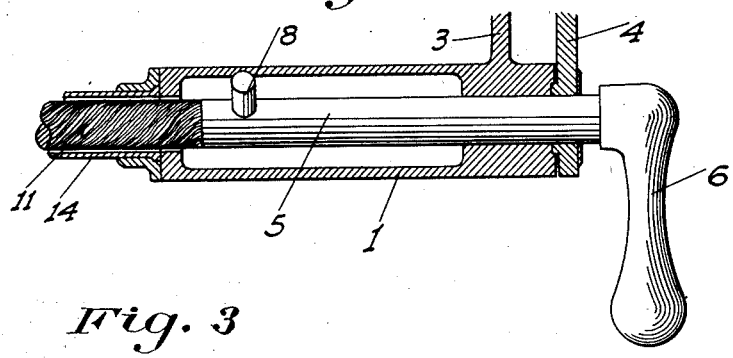
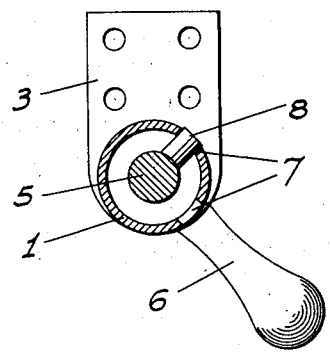
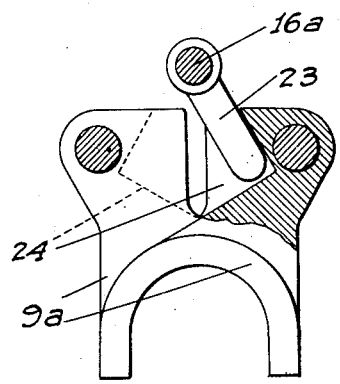
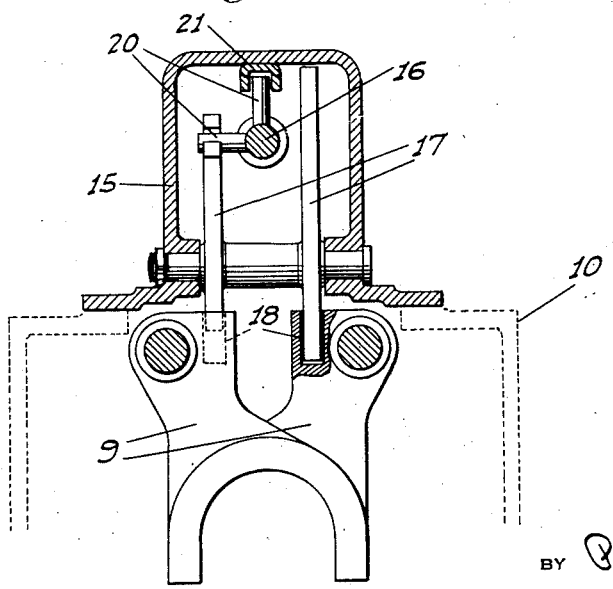

1,690,180

UNITED STATES PATENT OFFICE.

BENJAMIN F. SCHMIDT, OF LOS ANGELES, CALIFORNIA, ASSIGNOR TO GILLETTE SCHMIDT CORPORATION, OF LOS ANGELES, CALIFORNIA, A CORPORATION OF DELAWARE.

HAND-OPERATED GEAR-SHIFT MECHANISM.

Application filed June 19, 1926. Serial No. 117,137.

This invention relates to improvements in gear shifting mechanisms for motor vehicles and particularly represents an improvement or modification of the type shown in my copending application filed June 19th, 1926, Serial No. 116,574.

The apparatus of the present invention has all the advantages of said other type and has for its main object to provide a simplified structure by the use of a single flexible cable permanently connected to the operating handle and so disposed and arranged relative to the gear shifting forks of the transmission as to enable this one cable to be selectively engaged with either fork by a relatively slight turning movement of the handle one way or the other.

These objects I accomplish by means of such structure and relative arrangement of parts as will fully appear by a perusal of the following specification and claims.

In the drawings similar characters of reference indicate corresponding parts in the several views:

Fig. 1 is a side sectional outline of an ordinary transmission mechanism as arranged in connection with the usual floor and dashboard structure showing my improved gear shifting mechanism as installed in connection therewith.

Fig. 2 is a longitudinal section of the handle unit and its supporting structure.

Fig. 3 is a cross section on the line 3—3 of Fig. 1.

Fig. 4 is a cross section on the line 4—4 of Fig. 1 showing the operating connection with the gear shifting forks.

Fig. 5 is a fragmentary end view of the forks showing a modified form of operating connection therewith.

Referring now more particularly to the characters of reference on the drawings the numeral 1 denotes a rigid tubular casing of suitable size adapted to extend forwardly from the dashboard 2. At its rear end this casing preferably has an upstanding flange 3 to abut against the dashboard, while a cover plate 4 to cooperate with said flange and the adjacent end of the casing is placed against the rear face of the dashboard. These parts are clamped together and to the dashboard by suitable means so that the casing and plate form a unitary structure when mounted in place, and are rigidly held from displacement relative to the dashboard. The casing is substantially horizontally disposed or it may be placed at right angles to the vertical plane of the dashboard, as may be found most convenient.

Extending longitudinally through the casing and both slidably and turnably mounted therein is a shaft 5 on the outer end of which beyond the plate 4 is an operating handle 6 of suitable form. The casing 1 has a longitudinally extending H slot to receive a radial pin 8 projecting from the shaft. This slot is designed to determine and control the four different positions of the gear shifting forks 9 of the transmission structure 10, and the two longitudinal and parallel portions of this slot are spaced ninety degrees apart about the casing. To the forward end of the shaft 5 is connected one end of a flexible cable 11 which extends through the engine bulkhead 12, and then down and under the floor 13 to a rearwardly facing termination adjacent the forward end of the transmission structure 10. This cable is of such a nature as to enable it to turn or twist to the right or left without springing, while at the same time it is strong enough not to stretch when pulled. To guide the cable and prevent doubling up or buckling of the same when pushed I provide a housing 14 in which this cable is enclosed from end to end. The housing has inherent flexibility only sufficient to enable it to be bent during installation so as to avoid fixed and immovable parts of the car. It is connected at its upper end to the forward end of the casing 1 and at its lower end to the forward end of a cover-casing 15, which is mounted on top of the transmission 10.

The lower end of the cable 11 is connected to the forward end of a rigid rod 16 which is slidably and turnably mounted in the cover 15. This rod extends between a pair of independent transversely spaced levers 17 which are pivoted in common in the member 15. The lower ends of these levers have permanent rocking engagement with slots 18 formed in the respective forks 9.

The upper ends of the levers 17 are forked to provide longitudinal openings as at 19 to receive pins 20 projecting radially from the rod 16. These pins are transversely alined with each other about the shaft and are set 90 degrees apart or the same as the arcuate spacing of the parallel portions of the H slots 7. The levers 17 and the pins 20 are so disposed that only one pin at a time can be engaged with either lever, and one pin at any time only engages one of the levers while the other pin is arranged to engage only the other lever.

Fixed on and extending lengthwise of the cover 15 is an inverted channel 21 forming a guide for one pin while the other pin is engaged with its lever 17 as shown in Fig. 4. When the forks are in a neutral position the levers 17 and the fork-openings 19 thereof are in transverse alinement. The channel 21 has a transverse opening or notch 22 cut therethrough which alines with said openings 19 when the latter are transversely alined. It will therefore be seen that when the rod 16 is shifted longitudinally so that the pins 20 aline with these openings, said rod can then be turned one way or the other so as to enable the pins to be engaged with or disengaged from the respective lever openings. As soon as the rod moves lengthwise from this position, the pin which is positioned in the channel cannot leave the same and the other pin is therefore held against disengagement from its lever. At the same time the pin 8 on the handle shaft 5 moves along one or the other of the longitudinal portions of the H slot so that said shaft also cannot be turned. The cross member of the H slot represents of course the neutral position of the handle and shaft and when said shaft is moved longitudinally so that the pin 8 can pass through said transverse portion the channel and lever openings in the transmission structure are then transversely alined.

It will therefore be seen that when the handle and shaft are in the above positions a turning of the handle one way or other, to turn or twist the cable, will cause one or the other of the pins 20 to be engaged with the respective lever 17. A pull or push on the handle, imparting a longitudinal movement to the cable will then of course effect a longitudinal movement of the fork connected to the lever and a shifting of the corresponding gear.

With the above arrangement the length of the levers 17 may of course be such that a relatively great longitudinal movement of the shaft 5 is necessary to effect a short movement of the rod 16. This of course increases the power or leverage of the apparatus and is of benefit when the gears are heavy or hard to shift.

In some cases however this leverage may not be necessary, and I may place the rod 16ª close to the forks 9ª, eliminating the levers 17, and provide a single radial pin 23 depending from said rod 16ª. This pin is adapted to engage either at a time of slots or notches 24 provided in the adjacent faces of the forks 9ª and open toward each other. These slots would of course be so disposed that when the forks were in neutral position said slots would be transversely alined so that the pin 23 could then be shifted from one to the other of said slots.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a motor vehicle having a transmission structure which includes a pair of transversely spaced gear shifting forks, a flexible element of a nature to enable the same to be both rotated in either direction for gear selection and moved longitudinally for gear shifting, handle means connected to one end of the element, means between the other end of the element and the forks for enabling selective operating engagement of said forks with the element to be had with the rotation of said element, said element being longitudinally curved between its ends, and a fixed housing in which said element is enclosed from end to end.

2. In a motor vehicle having a transmission structure which includes a pair of transversely spaced gear shifting forks, a flexible element of a nature to enable the same to be both rotated in either direction and moved longitudinally, handle means connected to one end of the element, a pair of levers pivoted in the transmission structure in transversely spaced relation and connected to the shifting forks, a rod slidably and turnably mounted in said structure and projecting between the levers, the flexible element being connected to one end of the rod, and members on said rod for selective engagement with the respective levers when the element and rod are rotated.

3. In a motor vehicle having a transmission structure which includes a pair of transversely spaced gear shifting forks, a flexible element of a nature to enable the same to be both rotated in either direction and moved longitudinally, handle means connected to one end of the element, a pair of levers pivoted in the transmission structure in transversely spaced relation and connected to the shifting forks, a rod slidably and turnably mounted in said structure and projecting between the levers, the flexible element being connected to one end of the rod, members on said rod for selective engagement with the respective levers when the element and rod are rotated, and means enabling said selective engagement to be had only when the forks are in neutral position.

4. In a motor vehicle having a transmission structure which includes a pair of transversely spaced gear shifting forks, a flexible element of a nature to enable the same to be both rotated in either direction and moved longitudinally, handle means connected to one end of the element, a pair of levers pivoted in the transmission structure in transversely spaced relation and connected to the shifting forks, a rod slidably and turnably mounted in said structure and projecting between the levers, the flexible element being connected to one end of the rod, members on said rod for selective engagement with the respective levers when the element and rod are rotated, and means enabling said selective engagement to be had only when the forks are in neutral position, and preventing disengagement when the rod is moved longitudinally in either direction from a position corresponding to the neutral position of the forks.

5. In a motor vehicle having a transmission structure which includes a pair of transversely spaced gear shifting forks, an element of a nature to enable the same to be both rotated in either direction and moved longitudinally, handle means connected to one end of the element, a pair of levers pivoted in the transmission structure in transversely spaced relation and connected to the shifting forks, a rod slidably and turnably mounted in said structure and projecting between the levers, the element being connected to one end of the rod, radial and transversely alined pins projecting from the shaft at an angle to each other, the levers being longitudinally slotted to receive the pins, there being a pin for each lever-slot and the pins being so arranged as to enable only one being received into its slot at a time, and means preventing rotation of the rod and element to effect selective engagement of the pins with the levers except when the forks are in a neutral position.

6. In a motor vehicle having a transmission structure which includes a pair of transversely spaced gear shifting forks, an element of a nature to enable the same to be both rotated in either direction and moved longitudinally, handle means connected to one end of the element, a pair of levers pivoted in the transmission structure in transversely spaced relation and connected to the shifting forks, a rod slidably and turnably mounted in said structure and projecting between the levers, the element being connected to one end of the rod, radial and transversely alined pins projecting from the shaft at an angle to each other, the levers being longitudinally slotted to receive the pins, there being a pin for each lever-slot and the pins being so arranged as to enable only one being received into its slot at a time, said slots, when the forks are in neutral position, being transversely alined, and a guide channel for the pin not engaged with the lever slot mounted in the transmission structure parallel to the rod, said channel having a transverse opening to receive the pins therethrough and located to aline with the lower slots when the latter are in transverse alinement.

7. In a motor vehicle having a transmission structure and a dashboard above said structure, a continuous flexible element of a nature to be both rotated and moved longitudinally extending substantially in the form of a longitudinal vertical curve from adjacent the dashboard and thence forwardly, downwardly and rearwardly to adjacent the transmission structure, a housing for said element, a support for said housing attached to the dashboard, handle means connected to the adjacent end of the element projecting from the support, shifting forks in the transmission structure, and means between the adjacent end of the element and the forks for enabling selective operations with said forks being carried out when the element is rotated and gear shifting operations being carried out when said element is moved longitudinally.

In testimony whereof I affix my signature.

BENJAMIN F. SCHMIDT.